Sept. 10, 1940.  I. B. HOLTZ  2,214,416
HYDRAULIC POWER TRANSMISSION
Filed Sept. 23, 1939  2 Sheets-Sheet 1
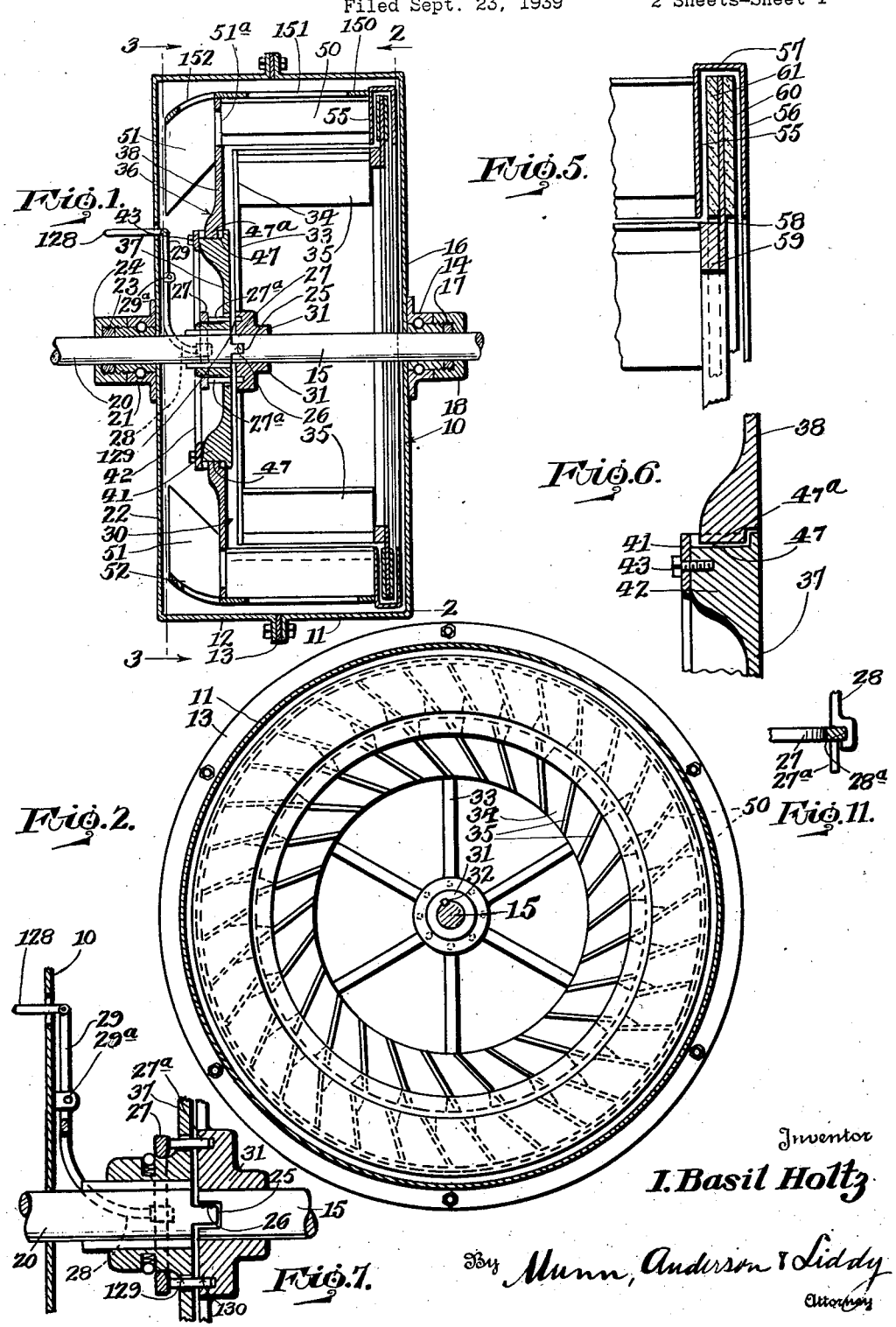
Inventor
I. Basil Holtz
By Munn, Anderson & Liddy
Attorney

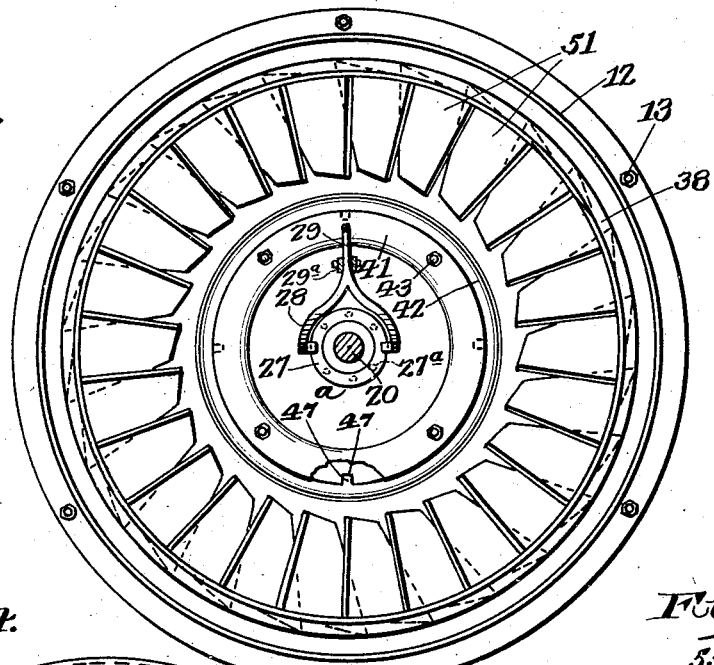
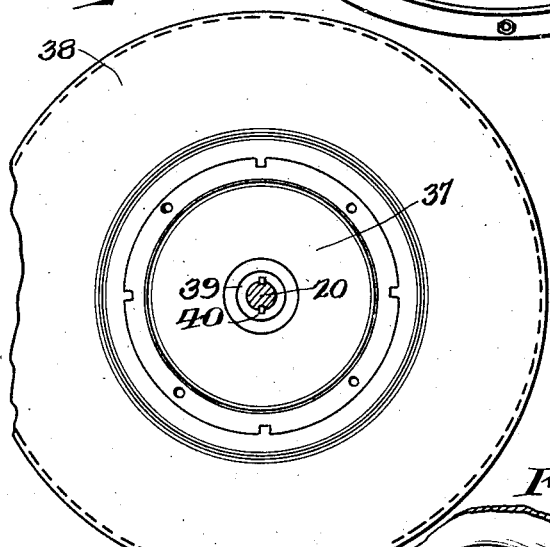
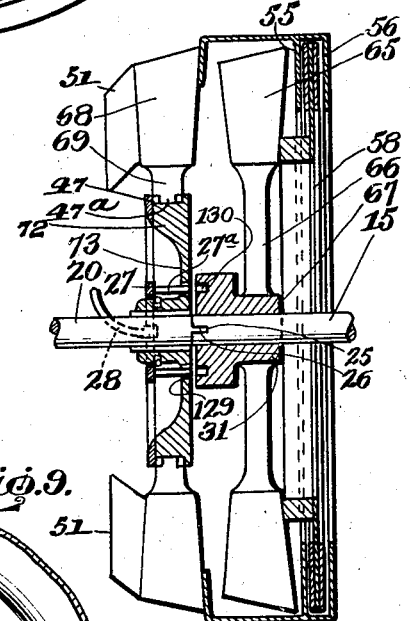
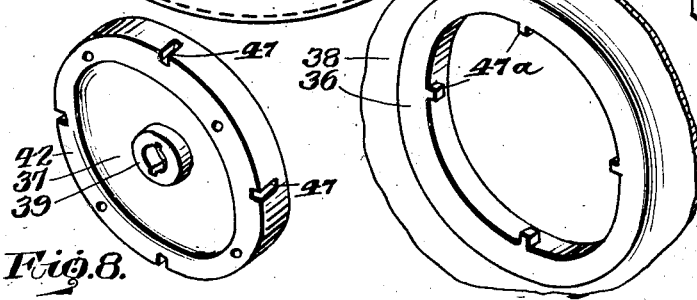

Patented Sept. 10, 1940

2,214,416

UNITED STATES PATENT OFFICE 2,214,416

HYDRAULIC POWER TRANSMISSION

Ireneus Basil Holtz, Ashville, Pa.

Application September 23, 1939, Serial No. 296,321

8 Claims. (Cl. 192—3.2)

This invention relates to an hydraulic power transmission.

An object of the invention is the provision of a transmission of the fluid type in which a driving member having a plurality of vanes forces the liquid against the vanes of a rotatable member for driving the same, the driving and driven members having cooperative clutch elements which are adapted to be moved into operative relation when the wheels of the vehicle are revolving faster than the driving member or when the driving member has sufficient speed of revolution to cause the liquid to act upon a means of the driven element for causing the driven element to be shifted whereby the clutch elements will be moved into operative relation.

Another object of the invention is the provision of a transmission in which a drive shaft operates a rotatable member containing blades for forcing a liquid against the blades of a driven member for causing operation of said driven member, the driven member embracing the rotatable driving member and being movable laterally for causing cooperating clutch elements to lock the driving and driven members together, a clutch being employed for connecting the drive and driven members together for direct drive independent of the previously mentioned clutch elements.

A further object of the invention is the provision of a transmission of the fluid type including a housing in which is mounted for rotation a driving member having vanes for forcing the fluid confined in the housing against blades formed on a driven member which embraces the driving member, the driven member having laterally disposed elements acted upon by the fluid for causing the driven member to shift laterally along its horizontal axis for causing cooperating clutch elements to connect the driving and driven members together.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a vertical section of a transmission constructed in accordance with the principles of my invention.

Figure 2 is a vertical section taken along the line 2—2 of Figure 1.

Figure 3 is a vertical section taken along the line 3—3 of Figure 1.

Figure 4 is a front view of a driven member with parts removed.

Figure 5 is an enlarged fragmentary vertical section of the cooperating clutch elements.

Figure 6 is an enlarged fragmentary vertical section showing the sliding connection between the two elements of the driven member.

Figure 7 is an enlarged fragmentary vertical section of a positive clutch between a driving and driven shaft, Figure 8 is a view in perspective of a section of the driven wheel, Figure 9 is a fragmentary view in perspective of the other section of the driven wheel, Figure 10 is a vertical section of a modified form of the invention, and Figure 11 is a fragmentary vertical section of a clutch element.

Referring more particularly to the drawings, 10 generally designates a housing formed of two sections 11 and 12 which are bolted together as shown at 13. This housing is sealed against the loss of fluid at all points.

A bearing 14 receives a driving shaft 15 and is mounted on a side wall 16 of the housing. A packing 17 and a nut 18 prevent the loss of fluid at this point.

A driven shaft 20 is mounted in a bearing 21 carried by the side wall 22 of the housing 10. A packing 23 and a nut 24 prevent the loss of fluid at this point.

The inner end of the shaft 20 is provided with a reduced portion 25 which is received within a socket 26 formed on the inner end of the shaft 15 for maintaining the shafts in alignment.

The shaft 20 is provided with a clutch element in the form of a ring 27 having pins 27a projecting laterally therefrom in parallel relation with the said shaft. This ring is shifted by a yoke 28 having grooves 28a to receive said ring (Fig. 11). A lever 29 pivoted at 29a on the housing 10 is rocked by a handle 128 extending through an opening in the housing. The yoke 28 extends from the lower end of the lever and at right angles thereto.

A driving wheel, generally designated by the numeral 30, is provided with a hub portion 31 secured to the shaft 21 as shown at 32. Spokes 33 radiate from the hub and are connected to an annular ring 34 which carries fins or blades 35. These blades are located at an acute angle to radii passing through the inner ends of the blades or fins. Furthermore, these blades may be located at an acute angle to the ring 34. The hub 31 and spokes 33 may be applied to the opposite face of the driving wheel 30 if necessary.

A driven wheel, generally designated by the numeral 36, is formed of an inner section 37 and an outer section 38. The inner section has a hub 39 secured to the shaft 20. Upon said hub is slidably mounted the ring 27. Spring-pressed detents 40 are mounted in pockets in the hub 39 and are adapted to retain the ring 27 in an operative or an inoperative position.

The pins 27a are slidably mounted in diametrically disposed openings 129 in the member 37 and are adapted to be projected into pockets 130 in the hub 31 for locking the member 37 and likewise the shaft 20 to the hub 31 and the shaft 15 for direct drive between the shafts.

A portion of the inner section adjacent the periphery shown at 41 is formed into an enlarged ring which projects outwardly from the face of the section. A ring 42 is bolted at 43 to the ring section 41. The outer periphery of the section 37 is provided with a plurality of transverse grooves or keyways 47 which are adapted to receive similarly placed ribs or keys 47a formed on the inner periphery of the section 38 so that the outer section may be shifted laterally on the inner section. The two sections, however, are locked together for simultaneous rotation by the keys and key-ways.

The driven wheel or rotor is provided with fins or blades 50 which have the same angular relation with respect to the ring 38 as the blades or fins 35 have with respect to the ring 34 of the rotor 30. The fins 50 are rigid with the section 38 and extend over the outer edges of the fins 35 and are spaced therefrom as shown more particularly in Fig. 1.

A plurality of blades or fins 51 are secured to the outer face of the section 38 of the driven wheel 36 and these fins extend downwardly and outwardly and terminate short of the inner face of the wall 22 and are located in the space 52 which is between the wall 22 and the driven wheel 36.

Openings 51a are formed in the section 38 between the blades 51 so that fluid which has acted on the blades 50 will pass through said openings and act on the blades 51. A ring 150 is secured to the outer periphery of the member 38 and has openings 151 between the blades 50.

A downwardly curved flange 152 extends from the ring 150 and over the blade 51. The upper edges of said blades are curved to conform to the curvature of the flange 152 and are secured thereto.

The fluid passage through and acting on the blades 51 exerts pressure on the member 38 to cause the same to move to the right in Fig. 1 for a purpose to be presently explained.

As shown more particularly in Fig. 5, an annular flange 55 in the form of a ring is secured to the opposite free ends of the blades 50. A second ring 56 is spaced from the ring 55 and is connected to the ring 55 by means of an annular bridging member 57. A ring 58 is formed integrally with or secured to a ring 59 which has greater thickness than the ring 58 and the ring 59 is secured in any approved manner to the free ends of the blades 35 adjacent to the wall 16 of the housing 10. The ring 58 is located substantially midway between the rings 55 and 56.

A friction lining 60 is secured to one face of the ring 58 which is opposite the ring 56. A friction lining 61 is secured to that face of the ring 58 which is opposite the ring 55 so that when the driven wheel 36 is moved toward the right in Figure 5, the friction lining 60 will engage the inner face of the ring 56 while when the driven wheel is moved in the opposite direction the friction lining 61 will engage the outer face of the ring 55.

Referring more particularly to Fig. 10, it will be seen that a modified form of the driving and driven wheels is disclosed in which the vanes 65 extend directly from the spokes 66 which are connected to the hub 67.

Vanes 68 extend from a ring 69 which has a portion 70 slidably keyed to the enlarged peripheral portion 72 of a disc 73 as shown at 47 and 47a. All of the remaining parts of the device are substantially identical with those shown in Figs. 1 to 6 inclusive and, therefore, the same reference numerals are employed. The only difference between the device shown in Fig. 10 and the device illustrated in Figs. 1 to 6 inclusive is the fact that the driven member and likewise the driving member of Fig. 7 are in the form of fans with the blades being movable substantially in the same circular space adjacent the periphery of the housing which encloses the driving and driven wheels.

The operation of my device is as follows: Power is applied to the shaft 15 for rotating the same and rotation of the shaft causes rotation of the driving wheel generally designated by the numeral 30 so that the liquid which substantially fills the housing 10 is forced against the blades 50 in Figure 1 by the blades 35, or the liquid is forced against the blades 68 by the blades 65 as shown in Figure 7. The driven wheel 36 is then caused to be revolved until the speed of rotation of the section 38 of the driven wheel 36 is such that the liquid acting on the laterally disposed blades 51 will cause the section 38 to be moved to the left in Figure 1 whereby the ring 56 carried by the driven member will engage the friction lining 60 carried by the ring 58. As the speed of the member 30 increases so will the speed of the member 36 increase until the two are driven at the same speed.

When the vehicle is traveling down hill and the accelerator pedal has been released the driven member 36 will tend to rotate faster than the drive wheel 30. At this time the blades 51 will be acted upon by the fluids in a reverse manner to that previously explained so that the member 36 will be moved to the right in Fig. 1 and the friction lining 60 will engage the inner face of the ring 56 whereby the vehicle wheels will tend to drive the engine at the same speed as the wheels of the vehicle and the engine will then act as a brake to retard the speed of movement of the vehicle.

There will be times when it will be necessary to connect the shafts 15 and 20 directly and at this time the pins 27a will be moved into the pockets 130 in the hub 31 by rocking the handle 128 and likewise the lever 29 and its connected yoke 28. The yoke moves the ring 27 and the pins 27a to the right in Figs. 1 and 10.

I claim:

1. A fluid transmission comprising a housing, a driving rotor in the housing, means driving the rotor, a driven rotor embracing the driving rotor and adapted to be revolved by fluid set in motion by the driving rotor, the driven rotor being formed on an inner and outer section, a shaft driven by the inner section, the outer section being slidable laterally on the inner section, and means cooperatively connecting the sections for simultaneous rotation.

2. A fluid transmission comprising a housing, a driving rotor in the housing, means driving the rotor, a driven rotor embracing the driving rotor and adapted to be revolved by fluid set in motion by the driving rotor, the driven rotor being formed on an inner and outer section, a shaft driven by the inner section, the outer section being slidable laterally on the inner section, means cooperatively connecting the section for simultaneous rotation, cooperative clutch members between the driving rotor and the outer section of the driven rotor, and means on the outer section for causing lateral shifting of the outer section so that the clutch members will be moved into engagement with each other.

3. A fluid transmission comprising a housing, a driving rotor in the housing, means driving the rotor, a driven rotor embracing the driving rotor and adapted to be revolved by fluid set in motion by the driving rotor, the driven rotor being formed on an inner and outer section, a shaft driven by the inner section, the outer section being slidable laterally on the inner section, means cooperatively connecting the section for simultaneous rotation, cooperative clutch members between the outer section and the driving rotor, a plurality of fins extending laterally from the outer section and adapted to be acted upon by the fluid acting on the driving rotor for causing lateral shifting of the outer section for moving the clutch members into cooperative engagement.

4. A fluid transmission comprising a housing, a driving rotor in the housing, means driving said rotor, a driven rotor embracing the driving rotor and adapted to be revolved by fluid set in motion by the driving rotor, cooperative clutch elements between the driving rotor and the driven rotor, and means acted upon by the fluid set in motion for causing the clutch elements to be moved into operative relationship with each other.

5. A fluid transmission comprising a housing, a driving rotor in the housing and provided with a plurality of fins adjacent the periphery thereof, means driving said rotor, a driven rotor having a plurality of fins embracing the periphery of the driving rotor and adapted to be revolved by fluid set in motion by the driving rotor, the driven rotor having a laterally shiftable element, means on said shiftable element acted on by the fluid for causing lateral shifting of said element, a cooperative clutch element on the shiftable element and the driving rotor for temporarily connecting the shiftable element with the driving element for a direct drive of said driven rotor, said shiftable element being connected to the driven rotor for simultaneous rotation.

6. A fluid transmission comprising a housing adapted to be filled with transmission liquid, a driving rotor in the housing, means driving said rotor, a driven rotor adapted to be revolved by fluid set in motion by the driving rotor, a ring forming a part of the driven rotor and shiftable laterally with respect to a plane passing through the driven rotor, cooperative means on the ring and driven rotor for connecting the ring for simultaneous rotation with the driven rotor, and means acted on by the fluid set in motion by the driving rotor for causing lateral shifting of the ring, a clutch element carried by the ring, a cooperating clutch element carried by the driving rotor and adapted to be moved into operative relationship with each other when the ring is laterally shifted.

7. A fluid transmission comprising a housing adapted to be filled with transmission liquid, a driving rotor in the housing, means driving said rotor, a driven rotor adapted to be revolved by fluid set in motion by the driving rotor, a ring forming the outer part of the driven rotor and shiftable laterally with respect to a plane passing through the driven rotor, a disc forming the inner part of the driven rotor having an annular channel at the outer periphery thereof provided with transverse grooves, said ring at its inner periphery being received by the annular channel and provided with inwardly projecting spaced ribs received by the transverse grooves for connecting the ring to the driven rotor for simultaneous rotation, and means acted on by the fluid set in motion by the driving rotor for causing lateral shifting of the ring, a clutch element carried by the ring, a cooperating clutch element carried by the driving rotor and adapted to be moved into operative relationship with each other when the ring is laterally shifted.

8. A fluid transmission comprising a housing adapted to be filled with transmission liquid, a driving rotor in the housing, means driving said rotor, a driven rotor adapted to be revolved by fluid set in motion by the driving rotor, a ring forming part of the driven rotor and shiftable laterally with respect to a plane passing through the driven rotor, the driven rotor having an annular channel at the periphery thereof provided with transverse teeth, said ring at its inner periphery being provided with inwardly projecting spaced ribs, a driven rotor being provided with grooves at its outer periphery thereof to receive the ribs for connecting the ring to the driven rotor for simultaneous rotation, and means acted on by the fluid set in motion by the driving rotor for causing lateral shifting of the ring, a clutch element carried by the ring, a cooperating clutch element carried by the driving rotor and adapted to be moved into operative relationship with each other when the ring is laterally shifted.

IRENEUS BASIL HOLTZ.